United States Patent [19]

Ogle et al.

[11] Patent Number: 4,605,890

[45] Date of Patent: Aug. 12, 1986

[54] SYNCHRO POWER AMPLIFIER AND CONTROL CIRCUIT FOR AUTOMATICALLY TUNING AN INDUCTIVE LOAD

[75] Inventors: Dennis F. Ogle, ChulaVista; Charles A. Clark, Jr., Chatsworth; Ramon H. Aires, Granada Hills, all of Calif.

[73] Assignee: Vernitron Corporation, Lake Success, N.Y.

[21] Appl. No.: 747,850

[22] Filed: Jun. 24, 1985

[51] Int. Cl.[4] .................................................. G05F 1/70
[52] U.S. Cl. .................................... 323/209; 323/354; 361/54
[58] Field of Search ............... 323/208, 209, 210, 211, 323/354; 361/54

[56] References Cited

U.S. PATENT DOCUMENTS 3,419,792  12/1968  Kasper et al. ...................... 323/209

*Primary Examiner*—Patrick R. Salce
*Assistant Examiner*—Anita M. Ault
*Attorney, Agent, or Firm*—Edward H. Loveman

[57] ABSTRACT

A synchro power amplifier and control circuit for an inductive load has a plurality of synchro leg amplifiers connected to the load. Each amplifier has an interstage transformer for deriving samples of current drawn by the load. A multiplicity of capacitors are respectively connectable in parallel with the (load) upstream of the amplifiers by switches in a circuit 10 responsive to the voltage/current phase angle of the power driving the load, to compensate for the inductance of the load.

9 Claims, 1 Drawing Figure

SYNCHRO POWER AMPLIFIER AND CONTROL CIRCUIT FOR AUTOMATICALLY TUNING AN INDUCTIVE LOAD

BACKGROUND OF THE INVENTION

1. Field of the Invention

This invention relates to the art of synchro signal transmission systems, and more particularly concerns a system having a circuit for automatically adding and substracting compensating capacitors for tuning inductive loads.

2. Prior Art

In synchronous power transmission systems it is well known to use load tuning capacitors with inductive loads to reduce energy dissipation in a driven load device. The capacitors reduce or eliminate the reactive component of the load making it appear resistive. However, if the tuning capacitors are selected for optimum operation at a given load, for example full load, excessive driving current is required at other, or lighter loads. What has been lacking is means to apply appropriate capacitive compensation for variable loads.

SUMMARY OF THE INVENTION

The present invention is directed at overcoming the deficiencies of prior synchronous signal transmission systems empolying load tuning capacitors with inductive loads, by providing an automatic tuning circuit which samples the phase of the load current and automatically tunes the output to optimize the load to be in phase with the applied voltage. The invention further includes unique circuit means for duty factor monitoring and control of the power amplifier using pulse width modulation.

OBJECTS OF THE INVENTION

It is therefore a principal object of the present invention to provide an automatic tuning circuit for sampling the phase of the current and automatically tuning the output.

It is another object of the present invention to provide a plurality of capacitors which are automatically switched into circuit in accordance with he amount of inductance in the sample being tested.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENT

Figure 1:
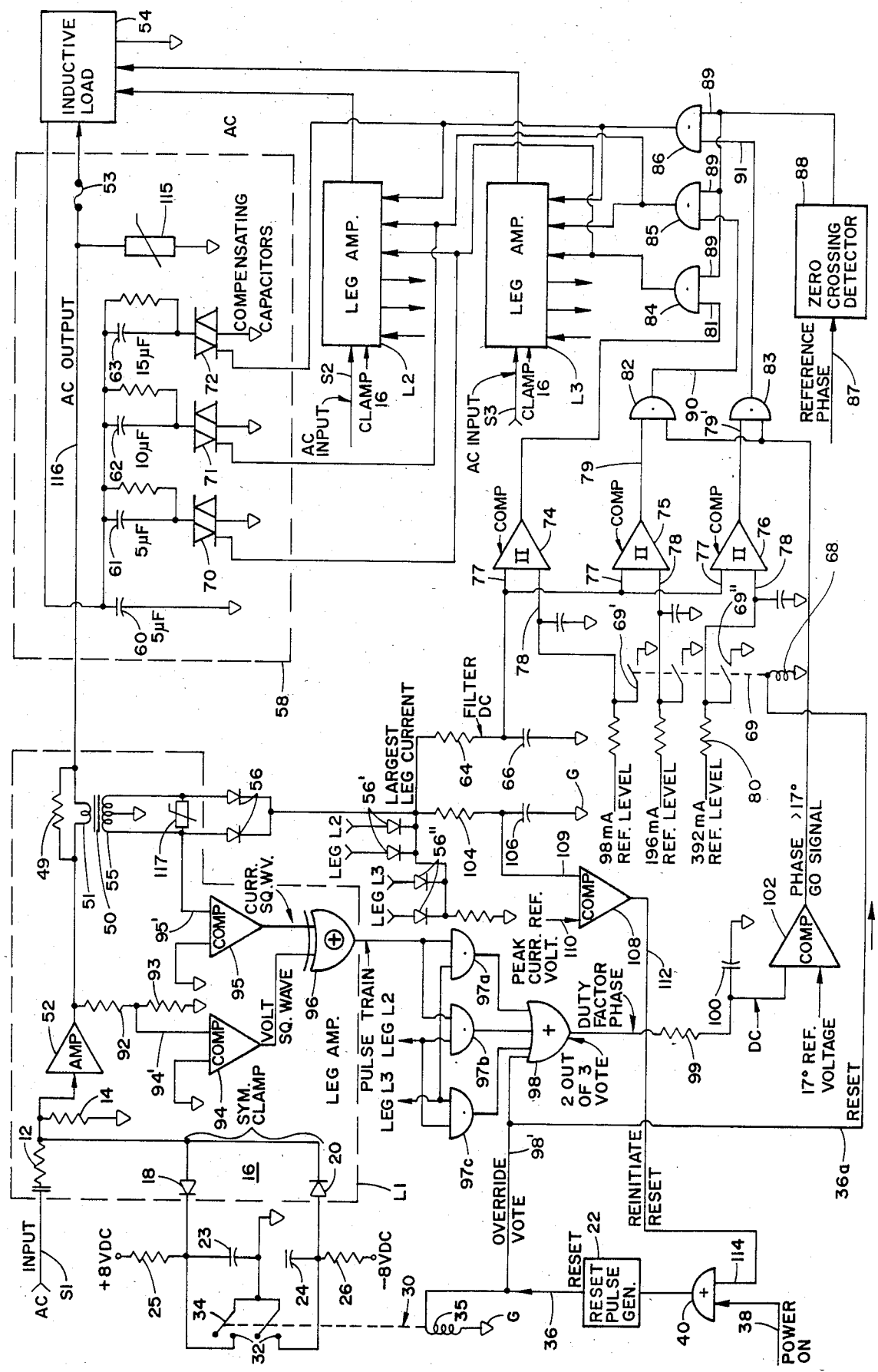
FIG. 1 is a circuit diagram of a synchro (AC) power amplifier with a circuit for automatically adding and subtracting compensating capacitors to the output while driving an inductive load.

Referring now to the drawing wherein like reference characters designate like or corresponding parts throughout, there is shown a signal transmission system having three synchronozided AC signal inputs S1, S2, and S3 respectively driving three independent leg amplifiers L1, L2, and L3. Only leg amplifier L1 enclosed in a dashed box is shown in detail since the other leg amplifiers L2 and L3 are substantially identical.

The leg amplifier L1 has an input voltage divider comprising resistors 12, 14 to which a symmetrical clamp 16 is connected. The clamp 16 comprises a pair of diode rectifiers 18, 20 controlled by a reset pulse generator 22. The clamp 16 further comprises a pair of capacitors 23, 24 and a pair of resistors 25, 26, A relay 30 has fixed contacts 32 and movable contacts 34 actuated by a relay coil 35 connected between the reset pulse generator 22 and common or ground G. The resistors 25 and 26 are respectively connected between terminals of an 8 volts DC power supply and capacitors 23, 24 to provide changing current. It will be understood that the one clamp 16 serves all three leg amplifiers L1, L2 and L3.

When a reset pulse is applied on a line 36 to the relay coil 35, the contacts 34 close with the contacts 32 and the capacitors 23, 24 charge through the respective resistors 25, 26 allowing the amplitudes of the AC signal inputs S1, S2 and S3 to increase toward their final value with a time constant (such as one second) determined by the resistance and capacitance values of the clamp 16. The resistors 25, 26 may each be 1000 ohms and the capacitors 23, 24 may each be 1000 microfarads, for example to obtain a one second time constant. Although the clamp 16 employs the relay 30 having contacts 32, 34 it is possible to substitute bipolar transistors or other solid state electronic components in place of the relay 30 to perform the clamping function.

When prime power is to be applied, a signal is present at one input 38 of a gate 40, whose output is connected to the reset pulse generator 22. The generator 22 will generate a reset pulse on the line 36 when prime power is applied or an output overcurrent condition occurs. The duration of the reset pulse may be long as ten seconds. When the reset pulse is applied to the clamp 16, all three leg amplifiers L1, L2 and L3 see a zero commanded voltage.

An audio interstage transformer 50 has a primary winding 51 connected between a local amplifier 52 and an inductive load 54, via a fuse 53. A resistor 49 is connected across the winding 51 which has a low resistance of about one half an ohm. A secondary winding 55 is connected in a balanced configuration to a pair of rectifiers 56. A capacitor assembly 58 is comprised of four load compensating capacitors 60-63 and is connected to the load 54 to apply compensating current thereto. The transformer 50 obtains a sample of the current drawn by the load 54. Since the compensating capacitors 60-63 are connected to the load 54 upstream from the transformer 50, only the transformer 50 samples the load current, and not the total load and compensation current. Each leg amplifier L1, L2 and L3 has its own current sampling interstage transformer 50. The sample current is rectified in the rectifiers 56. Current samples from all three leg amplifiers L1, L2, and L3 are applied to the respective diode rectifiers 56, 56', and 56'' respectively connected in an O-ring configuration. The full wave rectification of the sample currents and their combination in the O-ring produces a full wave representation of the largest load current of the three legs. A filter comprising a resistor 64 and a capacitor 66 is connected to the O-ring of the rectifiers 56 to produce a DC current whose magnitude is employed to select an appropriate one of the compensating capacitors 61-63 based only on the maximum leg current sampled.

Capacitor 60 of the compensating capacitor assembly 58 may have a value of five microfarads (5 uF) and is always in the circuit to compensate for minimum load inductance. Each of the other compensating capacitors 61-63 which may be selectively inserted into the circuit has an associated respective triac switch 70, 71 or 72. The capacitors 61-63 may have five, ten and fifteen microfarads capacitance values respectively. If desired, more than three selectively insertable capacitors (spaced 5 uF apart for example) each having its own triac switch may be provided Capacitance is added to the load circuit 54 when the maximum sampled leg current exceeds a designated threshold level.

Since the capacitance (5 uF) of capacitor 60 is always present, it is not necessary to add additional capacitance unless the load 54 has sufficient inductance to make the parallel combination of the 5 uF of the capacitor 60 and the load 54 look inductive. This happens above the value of inductance which resonates with 5 uF at 60 Hz. Additional capacitance will be required when the maximum leg current reaches any one of the three threshold levels for example: 98 mA rms, 196 mA rms and 392 mA rms.

Three comparators 74, 75 and 76 have their respective inputs 77 connected to the filter 64, 66 and are used for determining each threshold step. Reference level currents of each threshold value are applied to an input 78 of each of the comparators 74, 75 and 76 via a respective resistor 80. The output from the comparator 74 is connected to an input 81 of a gate 84. The output from the comparator 75 is connected to an input 79 of a gate 82. The output from the gate 82 is connected to an input 90 of a gate 85. The output from the comparator 76 is connected to an input 79' of a gate 83. The output from the gate 83 is connected to an input 91 of a gate 86. The comparators 74, 75 and 76, through the gates 82-86 direct the zero crossing pulses of selected triac switches 70, 71 and 72 at each crossing of the 60 Hz reference frequency applied at an input 87 of a zero crossing detector 88 whose output is applied to an input 89 of each of the gates 84, 85 and 86. Zero crossing is determinedd by the detector 88, which may be a full wave rectifier, and by one of the threshold comparators 74, 75, and 76. When a reset pulse is applied via a lines 36a to a coil 68 of the relay 69, relay contacts 69' close with fixed contacts 69", and short out the reference currents applied to the comparators 74, 75, and 76.

In selecting the capacitance steps above the first threshold, another factor which must be considered is the voltage/current phase angle of the load. The phase angle must be taken into account to prevent overloading of the several leg amplifiers L1, L2, and L3 with unneeded compensating capacitance when the load has a large real resistive component. A resistive divider comprising resistors 92 and 93, is connected between the amplifier 52 and the transformer 50 and is used to obtain a sample of the output voltage from the leg amplifier. The voltage sample is applied to an input 94' of a comparator 94 to produce square wave voltage pulses. The current sample derived by the transformer 50, is applied at an input 95' to a comparator 95 to obtain square wave current pulses. The square waves from the comparators 94 and 95 are applied to respective inputs of an OR gate 96. The gate 96 will produce at its output a pulse train having a duty factor which is proportional to the difference between the phase angle of the voltage and current square waves. Each of the three leg amplifiers L1, L2, L3 produces such a pulse train. To avoid ambiguities, which may arise when either the output voltage or the load current of a leg amplifier has zero amplitude, majority logic is used.

The majority logic is provided by three gates 97a, 97b, and 97c connected to the OR gate 96 in the respective leg amplifier. The three gates, 97a, 97b, and 97c are cross connected to ensue that two of the three legs must agree to have proper control of the phase measurement. The outputs of the three gates are connected to the input of a gate 98 to produce the duty factor phase measurement at the output of the gate 98. The reset pulse generator 22 is also connected via line 98' to an input of the gate 98 to override the majority vote and force a true output from the gate 98.

A low pass filter comprising a resistor 99 and a capacitor 100 is connected to the output of the gate 98 to produce a DC voltage level which is proportional to the phase angle of the load. This DC voltage level is applied to a comparator 102 along with a reference voltage which is 17 degrees of the load angle. The comparator 102 produces a go-ahead indication which is applied to the gates 82 and 83 for obtaining additional amounts of compensation capacitance when required.

During the reset period, all of the capacitor select thresholds are clamped to zero by the relay 69. The RC time constants of these reference levels assure that all of the capacitors will be in (total 35 mF) when these clamps and the leg amplifier input clamps are released. The reference time constants will be chosen to be much less than the one second time constant used for the leg amplifiers. These precautions ensure that the leg amplifiers will not have to sustain a load which appears inductive, and that the appropriate amount of compensation capacitance can be chosen before the amplifier output levels reach their final values.

The number of capacitance steps to be used depends on the degree of amplifier load benefit desired. Steps in capacitance must always be made before the composite load becomes inductive. Finer control can be obtained by employing more capacitors in closer steps, 5 uF apart for example, instead of the 10 uF and 15 uF steps.

An overcurrent circuit comprising a resistor 104, a capacitor 106, and the capacitors 62 and 63, and a comparator 108 is provided to inspect and monitor the absolute value of the load current. The resistor 104 is connected to the rectifiers 56, 56', and 56" for applying a voltage proportional to the largest leg current, to one input 109 of a comparator 108. A capacitor 106 is connected to common or ground G. A peak current reference voltage is applied the other input 110 of the comparator 108. If the allowable peak current is exceeded for longer than the time allowed by the resistor 104 and the capacitor 106 (a few milliseconds), a reinitiate reset voltage appears on an output line 112 of the comparator 108. This reset voltage is applied to an input 114 of the gate 40 to reinitiate the reset cycle.

A metal oxide varistor 115 connected across an output line 116 limits excess load current. A varistor 117 connected across the transformer winding 55 performs a similar current limiting function.

From the foregoing, it will be apparent that regardless of the amount of inductance in the load 54, the addition of compensating capacitance minimizes the voltage-current phase angle, so that the apparent power drawn approximates the real power. The compensating capacitance is automatically inserted in response to voltage/current phase angle changes, and whenever the parallel combination of load inductance and added capacitance looks inductive to the leg amplifiers.

It should be understood that the foregoing relates to only a preferred embodiment of the invention which has been by way of example only and that it is intended to cover all changes and modifications of the example of the invention herein chosen for the purpose of the disclosure, which do not constitute departures from the spirit and scope of the invention.

What is claimed is:

1. A power amplifier control circuit for an inductive load driven by a plurality of synchro AC inputs, comprising:
   a plurality of leg amplifiers respectively connected between said AC inputs and said load, each of said amplifiers having circuit means for deriving current samples drawn only by said load from said amplifiers;
   a multiplicity of capacitors respectively connectable in parallel with said load upstream of said amplifiers; and
   a plurality of switches connected respectively in circuit with said capacitors for selecting one of said capacitors and for connecting said selected capacitor in parallel with said load to compensate for inductance of said load.

2. A power amplifier control circuit as defined in claim 1, wherein each of said circuit means for sampling current comprises an interstage transformer.

3. A power amplifier control circuit as defined in claim 1, further comprising:
   a reset pulse generator arranged to generate a reset pulse cycle of predetermined time duration; and
   clamping means connected between said reset pulse generator and each input of each of said leg amplifiers, and operative to command to zero voltage each of said leg amplifiers for said predetermined time duration when said reset pulse is applied thereto.

4. A power amplifier control circuit as defined in claim 3, further comprising:
   rectifier means connected to said circuit means for rectifying said current samples;
   a plurality of comparators having first and second inputs, said rectifier means being connected to said first inputs of said comparators;
   a plurality of reference current sources of different current levels respectively connected to said second inputs of said comparators, said comparators being effective to compare a larger one of said rectified current samples with said reference currents; and
   gates connected between said comparators and said switches for connecting one of said capacitors in parallel with said load to compensate for said inductance of said load.

5. A power amplifier control circuit as defined in claim 4, further comprising:
   another comparator having two inputs and an output;
   a resistor-capacitor filter having a predetermined time constant and connected in circuit with said rectifier means and one input of said other comparator, for applying to said other comparator a peak voltage proportional to the largest current passed by any one of said leg amplifiers; and
   a source of reference voltage connected to the other input of said other comparator, so that said other comparator compares said reference voltage with said peak voltage, said output of said other comparator being connected to said reset pulse generator to apply thereto a reinitiate reset voltage pulse if said peak voltage exceeds said reference voltage for a short time determined by said time constant to reinitiate said reset cycle.

6. A power amplifier control circuit as defined in claim 4, further comprising: first square pulse generating means connected to said circuit means for generating first square pulses corresponding to said current samples;
   second square pulse generating means connected to said AC inputs for generating second square pulses corresponding to voltages applied by said amplifiers to said load; and
   pulse selection gates connected to said first and second square pulse generating means for measuring phase angles between the current and the voltage applied to said load.

7. A power amplifier control circuit as defined in claim 6, further comprising voltage comparator means connected between said pulse selection gates and said first named gates for applying a go-ahead signal to said first named gates to operate a selected one of said switches.

8. A power amplifier control circuit as defined in claim 7, wherein said reset pulse generator is connected to said pulse selection gates to apply an overriding pulse thereto for preventing application of said go ahead signal to said first named gates during said reset pulse cycle.

9. A power amplifier control circuit as defined in claim 4, further comprising relay means in circuit with said reference current sources and connected to said rest pulse generator for cutting off said reference currents when said reset pulse is being generated.

* * * * *

UNITED STATES PATENT AND TRADEMARK OFFICE
CERTIFICATE OF CORRECTION

PATENT NO. : 4,605,890

DATED : August 12, 1986

INVENTOR(S) : Dennis F. Ogle, Charles A. Clark Jr., Ramon H. Aires

It is certified that error appears in the above-identified patent and that said Letters Patent are hereby corrected as shown below:

IN THE SPECIFICATION:

At Column 2, line 48, "upstream" should read ---downstream---.

Signed and Sealed this

Twenty-eighth Day of April, 1987

Attest:

DONALD J. QUIGG

Attesting Officer

Commissioner of Patents and Trademarks